(12) United States Patent
Monti

(10) Patent No.: US 12,103,172 B2
(45) Date of Patent: Oct. 1, 2024

(54) CABLE-DRIVEN ROBOT

(71) Applicant: Marchesini Group S.P.A., Pianoro (IT)

(72) Inventor: Giuseppe Monti, Pianoro (IT)

(73) Assignee: Marchesini Group S.P.A. (IT)

( * ) Notice: Subject to any disclaimer, the term of this patent is extended or adjusted under 35 U.S.C. 154(b) by 0 days.

(21) Appl. No.: 18/264,788

(22) PCT Filed: Feb. 18, 2022

(86) PCT No.: PCT/IB2022/051456
§ 371 (c)(1),
(2) Date: Aug. 9, 2023

(87) PCT Pub. No.: WO2022/180492
PCT Pub. Date: Sep. 1, 2022

(65) Prior Publication Data
US 2024/0109180 A1   Apr. 4, 2024

(30) Foreign Application Priority Data

Feb. 24, 2021   (IT) ................. 102021000004247

(51) Int. Cl.
*B25J 9/00* (2006.01)
(52) U.S. Cl.
CPC .................... *B25J 9/0078* (2013.01)
(58) Field of Classification Search
CPC . B25J 13/08; B25J 9/104; B25J 9/1697; B25J 9/0078; B25J 9/00; H01N 30/101; H01H 30/20; H01H 30/06
See application file for complete search history.

(56) References Cited

U.S. PATENT DOCUMENTS

| | | | | |
|---|---|---|---|---|
| 5,092,646 | A * | 3/1992 | Smallridge | B25J 9/104 623/64 |
| 5,313,854 | A * | 5/1994 | Akeel | B23Q 1/5462 901/43 |
| 6,975,089 | B2 * | 12/2005 | Rodnunsky | B25J 9/0078 318/649 |
| 10,471,590 | B1 * | 11/2019 | Vachon | B25J 9/1623 |

(Continued)

FOREIGN PATENT DOCUMENTS

EP   2982483 A2   2/2016

*Primary Examiner* — Zakaria Elahmadi
(74) *Attorney, Agent, or Firm* — Endurance Law Group PLC

(57) ABSTRACT

The cable-driven robot (100) comprises: a base structure (1); a plurality of cables (C; C1); a movable element (EM) which is maintained suspended by means of the plurality of cables (C; C1); a movement system (2) for moving the cables (C; C1), and thus for moving the movable operating element (EM) in space, comprising a plurality of winding elements (4) of the cables (C; C1) which are activatable in rotation for winding/unwinding the cables (C, C1). At least a cable (C1) of the plurality of cables (C; C1) is realised in such a way as to comprise a central core (5) and an outer cladding jacket (6). The central core (5) is made of a conductive material so as to enable the transmission of electrical current and/or a command signal to an end of the cable (C1) connected to the movable element (EM), while the outer cladding jacket (6) is made of a braided synthetic material so as provide the cable (C1) with resistance to traction and flexion loads.

19 Claims, 2 Drawing Sheets

(56) References Cited

U.S. PATENT DOCUMENTS

| | | | | |
|---|---|---|---|---|
| 2004/0124803 | A1* | 7/2004 | Rodnunsky | B66C 13/085 318/649 |
| 2005/0024005 | A1* | 2/2005 | Rodnunsky | B25J 9/0078 318/649 |
| 2007/0152141 | A1* | 7/2007 | Rodnunsky | B66C 13/08 250/221 |
| 2008/0054836 | A1* | 3/2008 | Rodnunsky | B66C 21/00 318/649 |
| 2016/0001443 | A1* | 1/2016 | Davis | A63G 31/16 74/490.08 |
| 2019/0152051 | A1* | 5/2019 | Bramberger | B33Y 10/00 |
| 2020/0058844 | A1* | 2/2020 | Tanimoto | H10N 30/20 |

* cited by examiner

CABLE-DRIVEN ROBOT

DESCRIPTION OF THE INVENTION

Technical Field

The present invention relates to the technical sector concerning parallel robots, in particular cable-driven robots.

DESCRIPTION OF THE PRIOR ART

Cable-driven robots use cables to maintain an element or device in suspension and to move the element or device internally of a three-dimensional space. Cable-driven robots comprise a base structure, or frame, which is fixed, a movable element which is maintained suspended by a series of cables, and which must be moved in a three-dimensional space with respect to the base structure, by movement of the cables, following a lengthening or shortening thereof.

Cable-driven robots comprise, in this regard, a movement system for moving the cables, i.e. for lengthening and shortening them.

The movement system of the cables (S) usually comprises a series of movement units, one for each cable.

Each movement unit comprises a winding element of the cable, for example a drum, about which the cable is wound or unwound, and a motor means for activation in rotation of the winding element, in one rotation direction or the other, for winding or unwinding the cable thereon.

In this way, each cable, connected by a first end to the movable element to the movable element and at a second end to the drum, can be shortened (wound on the drum) or lengthened (unwound from the drum) and thus the length thereof (extension) between the fixing point to the movable element and the respective drum can be varied, either by decreasing or increasing.

Therefore, by appropriately activating the various motors, i.e. by activating in rotation the respective drums connected thereto, and thus lengthening or shortening the various cables, it is possible to move and displace the movable element with respect to the base structure, and vary the position thereof in a three-dimensional work space.

The movable operating element can, for example, comprise a tool, or a platform, on which an operating organ is mounted and predisposed for carrying out determined work operations, such as, for example, picking up and releasing of an object, or other types of operations or processes.

In this type of cable-driven robots it is frequently necessary to be have available a current supply, or there is the need to carry a signal, for example a command or control signal, directly to the movable element, in order to be able to activate and command the various tools, devices or operating organs predisposed thereon.

At present, a first known solution includes mounting and predisposing a battery, or another type of accumulator of electrical energy, directly on the movable element.

This solution, however, is not optimal, nor entirely satisfactory, as the weight of the battery can have an effect on the movement of the movable element.

Further, once the battery has run out, it has to be replaced, or if it is rechargeable, needs to be recharged.

Another solution at present in use consists in the use of suspended structures in the form of an overhead conveyor or articulated arms carrying a supply cable to the movable element.

This type of solution also presents various drawbacks.

Firstly, it requires a not-insignificant volume, as the support structure of the supply cable occupies a space a space internally of the base structure in which the movable element is to be moved.

Secondly, the movement of the support structure of the supply cable must be coordinated with the support structure of the movable element in order to follow it in its spatial movement with respect to the base structure.

SUMMARY OF THE INVENTION

The aim of the present invention is therefore to provide a novel cable-driven robot able to obviate the above-mentioned drawbacks of the prior art.

In particular, the aim of the present invention is therefore to provide a cable-driven robot able to make available an electric supply, or a command or control signal, directly to the movable element in a simple and effective, as well as reliable, manner.

The above aims are attained according to a cable-driven robot according to the claims.

DESCRIPTION OF THE DRAWINGS

The characteristics of preferred, but not exclusive, embodiments of the cable-driven robot of the present invention will be set out in the following description with reference to the appended tables of drawings, in which.

PREFERRED EMBODIMENTS

Figure 1:
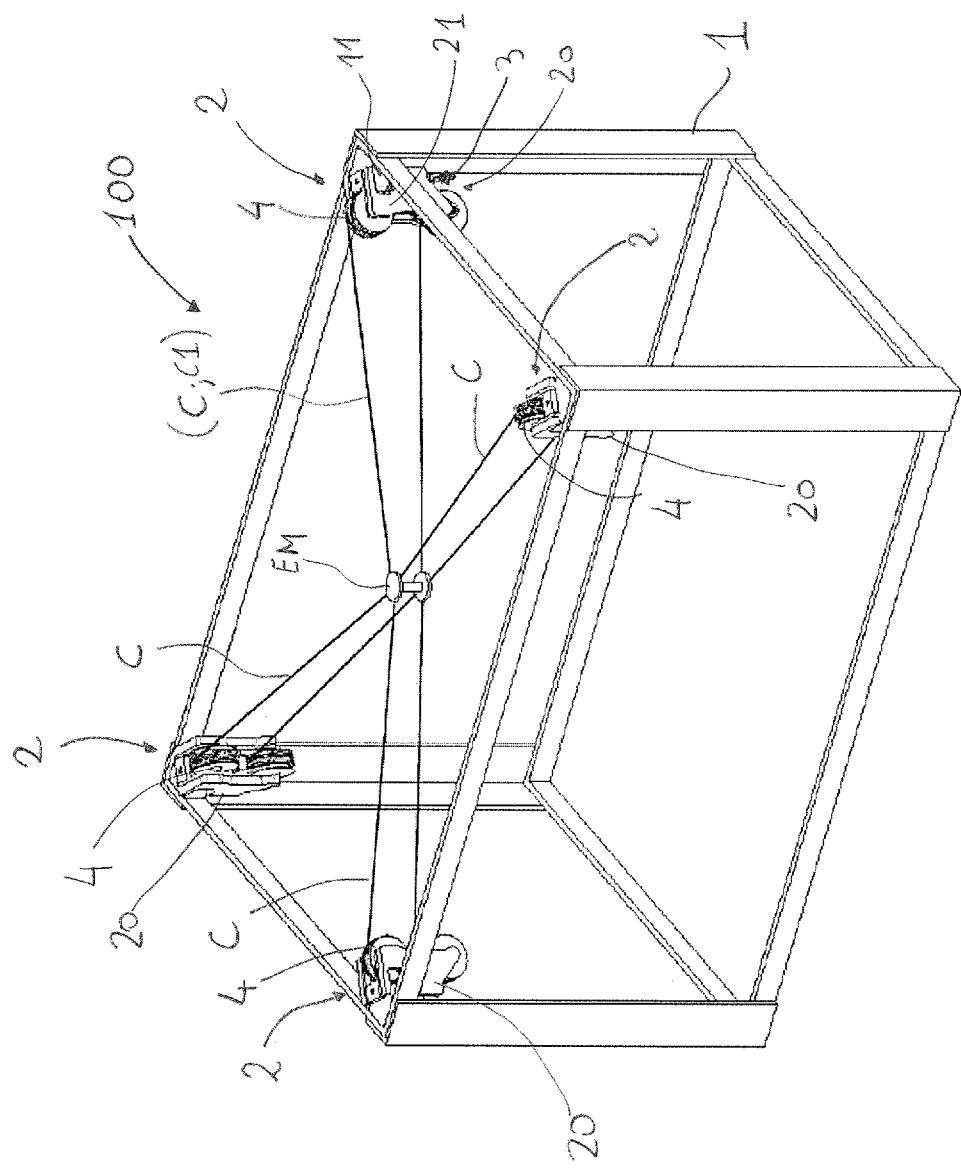
FIG. 1 illustrates an entirely schematic perspective view of the cable-driven robot of the present invention.

With reference to the appended tables of drawings, reference numeral (100) denotes the cable-driven robot of the present invention in its entirety.

The cable-driven robot (100) is schematically illustrated in FIG. 1.

It comprises: a base structure (1); a plurality of cables (C; C1) and a movable element (EM) which is maintained suspended by means of the plurality of cables (C; C1).

The movable element (EM) is illustrated in a stylised way and entirely schematically: it can be constituted by a gripping means, a tool, an instrument, or another operating organ which for the functioning thereof must be suppliable with a current and/or voltage, or must receive a command signal for carrying out a determined operation and/or process.

The movable element can also be a platform on which the above-mentioned organs/tools/instruments are arranged.

The cable-driven robot further comprises a movement system (2) for moving the cables (C; C1), and thus for moving the movable operating element (EM) in space with respect to the base structure (1).

The movement system (2) comprises a plurality of winding elements (4) of the cables (C; C1) which are activatable in rotation for winding/unwinding the cables (C, C1).

In this regard, the cables (C C1) comprise a first end which is fixed to the movable element (EM) and a second end which is connected to a respective winding element (4) of the movement system (2).

The peculiarities of the cable-driven robot (100) described in the present invention consist in the fact that at least a cable (C1) of the plurality of cables (C; C1) is realised in the following way.

Figure 2:
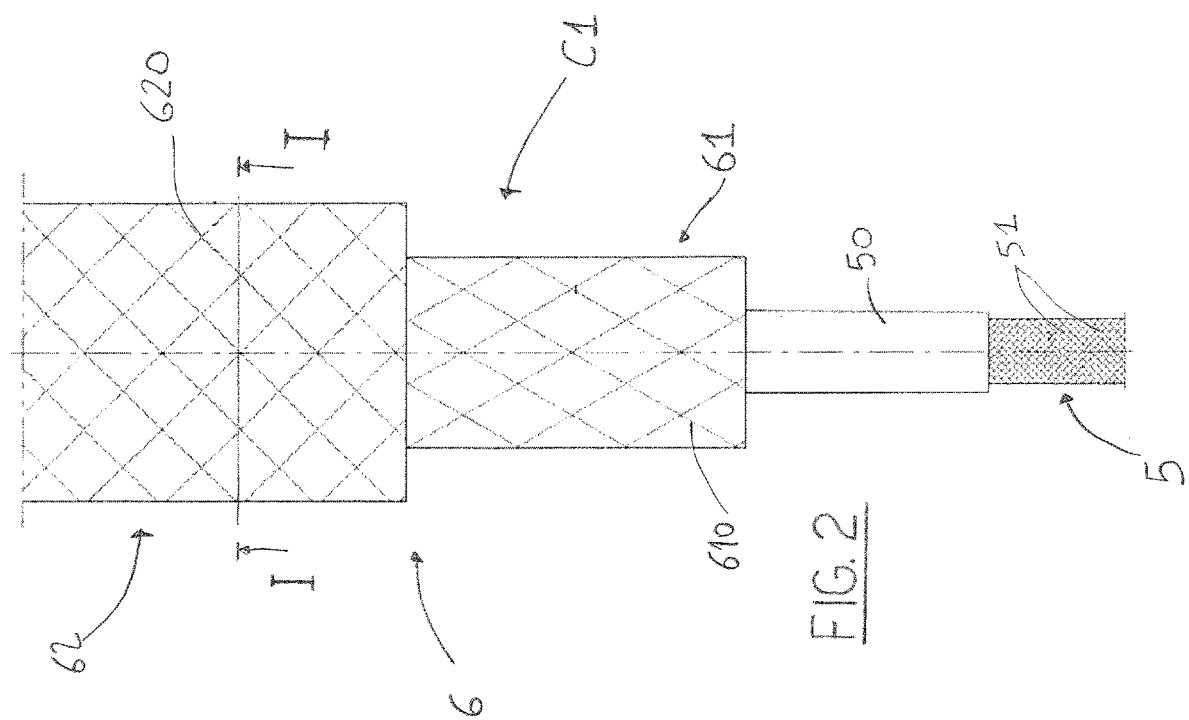
FIG. 2 illustrates, in a partially plan and a partially cutaway view, a particularly significant element of the cable-driven robot of the invention, for carrying an electric supply, and/or a command or control signal directly to the movable element.

The at least a cable (C1) (see for example FIG. 2 and FIG. 3) is made in such a way as to comprise a central core (5) and an outer cladding jacket (6).

In detail, the central core (5) is made of a conductive material so as to enable the transmission of electrical current and/or a command signal to an end of the cable (C1) connected to the movable element (EM), the outer cladding jacket (6) is made of a braided synthetic material so as to provide the cable (C1) with resistance to traction and flexion loads.

In this way, owing to the special structure of the cable (C1), in particular the central core made of a conductive material, with the cable (C1) that is used for the suspension and movement of the movable element, and therefore without having recourse to accumulators or batteries to be predisposed on the movable element or external systems, it is possible to bring, directly to the movable element, an electric supply and/or a command signal for operation thereof.

Further, owing to the presence of the outer cladding jacket (6), made of braided synthetic material, the cable (C1) is provided with a sufficient resistance to traction and flexion loads to which it may be subjected during the winding thereof on and/or the unwinding from the respective winding element for moving the movable operating element (EM) in space with respect to the base structure (1).

The cable (C1) is made in such a way that the outer cladding jacket (6) comprises a first inner layer (61) constituted by a plurality of first strands (7) which are arranged about the central core (5) and which are braided to one another to form a first braid (610) wound about the central core (5).

Each of the strands (7) of the plurality of first strands (7) is constituted by a series of monofilaments (71) made of a high-density synthetic material braided to one another.

The monofilaments (71) made of synthetic material utilised have a high elastic modulus and a high strength-weight ratio, with the aim of making the cable (C1) light but at the same time resistant to high loads (for example at least up to 1-2 kN), with an extremely low elongation (lower than 2% elongation at break).

In this regard, the monofilaments (71) of the series of monofilaments (71) which form the strands (7) of the first series of strands (7) are made of high-density polyethylene.

Further, in order also to give the cable (C1) a resistance to wear, the outer cladding jacket (6) is made in such a way as to comprise a second outer layer (62) constituted by a plurality of second strands (8), which are arranged about the plurality of first strands (7) which form the first inner layer (61), which are braided to one another to form a second braid (620) wound about the first braid (610) formed by the plurality of first strands (7) braided to one another.

Each of the strands (8) of the plurality of second strands (8) is constituted by a series of monofilaments (81) made of a high-tenacity synthetic material braided to one another.

The monofilaments (81) of the series of monofilaments (81) which form the strands (8) of the second series of strands (8) are made of polyester, in particular 100% polyester.

Owing to the double layer with which the outer cladding jacket, the cable (C1) will therefore be provided with a high-load resistance, both of flexion and of traction, with a minimum lengthening, and, at the same time, also a resistance to wear.

Figure 3:
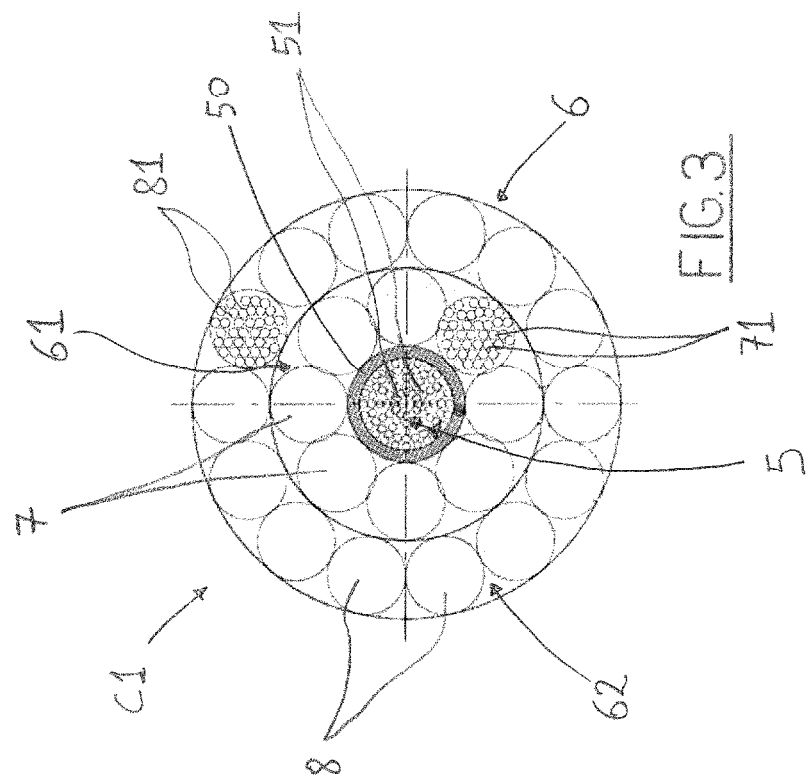
FIG. 3 is the view along the transversal section plane I-I of FIG. 2.

In the preferred but not exclusive embodiment, illustrated in FIG. 3, the first inner layer (61) of the outer cladding jacket (6) is formed by 8 strands (7) braided to one another with monofilaments (71) made of a high-density polyethylene, while the second outer layer (62) of the outer cladding jacket (6) is formed by 14 strands (8) braided to one another with monofilaments (81) made of 100% polyester.

The two layers of the outer cladding jacket can also be made with a different number of strands.

In a further preferred aspect, the cable (C1) is made in such a way that the central core (5) comprises a plurality of wires (51) made of an electrically-conductive material.

In particular, the plurality of wires (51) made of an electrically-conductive material which form the central core (5) are spirally-wound to one another.

This enables providing the cable (C1) with greater flexibility, and thus facilitating the winding/unwinding thereof from the respective winding element.

The plurality of wires (51) made of an electrically-conductive material which form the central core (5) comprise copper wires.

Alternatively, in another possible embodiment of the cable (C1), the central core (5) can be constituted by a plurality of strands (51) of galvanised steel wires spirally-wound to one another.

In a further preferred aspect, the cable (C1) can comprise an intermediate jacket (50) made of an insulating material which is interposed between the central core (5) and the outer cladding (6) jacket of the cable (C1).

For example, the intermediate jacket (50), made of an insulating material, can be made of rigid PVC.

Further, with the purpose of providing a greater resistance to wear, the cable (C1) can be made in such a way as to comprise a covering layer (not illustrated in detail in the figures), arranged about the outer cladding (6) jacket of the cable (C1), which is made of polyurethane.

A further other special aspect of the invention relates to the ways in which the movement system (2) of the cables can be realised.

As for example illustrated in FIG. 1, though very schematically, the movement system (2) of the cables comprises a plurality of movement units (20) of which at least one whereof is realised in such a way as to comprise:
  a frame (21), hinged to a part (11) of the base structure (1) pivotingly about a vertical hinge axis (V) so that the frame (21) can rotate with respect to the base structure (1) about the vertical hinge axis (V);
  a motor (3), which is mounted on the frame (21);
  and at least a winding/unwinding element (4) (for example a drum) of a respective cable (C; C1) of the plurality of cables (C; C1) which is mounted on the frame (21) and drivable in rotation by the motor (3).

In this way, as regards the cable (C1), i.e. the one realised as described in the foregoing, it will not be necessary to utilise deviating elements or cable-guiding elements, as it will always be correctly orientated towards the movable element, since the frame is pivoting with respect to the base structure, i.e. is rotatable about a vertical hinge axis with respect to a part of the base structure, during the movement of the movable element in space, and the cable will not be subject to deviations or twisting.

Therefore, the winding element of the cable, when rotating with the frame with respect to the base structure, will automatically adjust the orientation and position thereof to the position which time by time the movable element will assume, so that in practice there is an auto-alignment to the actual position assumed by the movable element.

In substance, the portion of cable comprised between the movable element and the winding element, will always be substantially perpendicular to the rotation axis of the winding element.

In this way the onset of undesirable further stresses either in flexion or torque of the cable will be prevented, which, over time, might be the cause of wear and deterioration of the cable.

From the above description, it is clear that the cable-driven robot object of the present invention will obviate the problems present in the prior art and highlighted in the preamble, by succeeding in providing a current supplying and/or a command signal directly to the movable element by exploiting at least one of the cables utilised to keep the same movable element suspended and in motion.

The invention claimed is:

1. A cable-driven robot (100) comprising: a base structure (1); a plurality of cables (C; C1); a movable element (EM) which is maintained suspended by means of the plurality of cables (C; C1); a movement system (2) for moving the cables (C; C1), and thus for moving the movable operating element (EM) in space with respect to the base structure (1), comprising a plurality of winding elements (4) of the cables (C; C1) which are drivable in rotation for winding/unwinding the cables (C, C1), wherein the cables (C C1) comprise a first end connected to the movable element (EM) and a second end connected to a respective winding element (4) of the movement system (2); at least a cable (C1) of the plurality of cables (C; C1) is made in such a way as to comprise a central core (5) and an outer cladding jacket (6), wherein the central core (5) is made of a conductive material so as to enable the transmission of electrical current and/or a command signal up to an end of the cable (C1) connected to the movable element (EM); wherein the outer cladding jacket (6) is made of a braided synthetic material so as provide the cable (C1) with resistance to traction and flexion loads, characterised in that the outer cladding jacket (6) comprises a first inner layer (61) comprising a plurality of first strands (7) which are arranged about the central core (5) and which are braided to one another to form a first braid (610) wound about the central core (5), wherein each of the strands (7) of the plurality of first strands (7) is constituted by a series of monofilaments (71) made of a high-density synthetic material braided to one another, wherein the monofilaments (71) made of a high-density synthetic material of the series of monofilaments (71) which form the strands (7) of the first series of strands (7) are made of high-density polyethylene, and in that the outer cladding jacket (6) comprises a second outer layer (62) comprising a plurality of second strands (8), which are arranged about the plurality of first strands (7) which form the first inner layer (61), and which are braided to one another to form a second braid (620) wound about the first braid (610) formed by the plurality of first strands (7) braided to one another, wherein each of the strands (8) of the plurality of second strands (8) is constituted by a series of monofilaments (81) made of a high-tenacity synthetic material braided to one another, wherein the monofilaments (81) made of a high-tenacity synthetic material of the series of monofilaments (81) which form the strands (8) of the second series of strands (8) are made of polyester.

2. The cable-driven robot (100) of claim 1, wherein the central core (5) comprises a plurality of wires (51) made of an electrically-conductive material.

3. The cable-driven robot (100) of claim 2, wherein the plurality of wires (51) made of an electrically-conductive material which form the central core (5) are spirally-wound to one another.

4. The cable-driven robot (100) of claim 2, wherein the plurality of wires (51) made of an electrically-conductive material which form the central core (5) comprise copper wires.

5. The cable-driven robot (100) of claim 1, wherein the central core (5) is constituted by a plurality of strands (51) of galvanised steel wires spirally-wound to one another.

6. The cable-driven robot (100) of claim 1, comprising an intermediate jacket (50) made of an insulating material interposed between the central core (5) and the outer cladding jacket (6) of the cable (C1).

7. The cable-driven robot (100) of claim 6, wherein the intermediate jacket (50) made of an insulating material is made of PVC.

8. The cable-driven robot (100) of claim 1, comprising a covering layer, arranged about the outer cladding jacket (6) of the cable (C1), which is made of polyurethane.

9. The cable-driven robot (100) of claim 1, wherein the movement system (2) of the cables comprises a plurality of movement units (20) of which at least one is realised in such a way as to comprise: a frame (21), which is hinged to a part (11) of the base structure (1) pivotingly about a vertical hinge axis so that the frame (21) can rotate about the vertical hinge axis with respect to the base structure (1); a motor (3), which is mounted on the frame (21); and at least a winding/unwinding element (4) of a respective cable (C; C1) of the plurality of cables (C; C1) which is mounted on the frame (21) and drivable in rotation by the motor (3).

10. A cable-driven robot comprising:
a base structure;
a plurality of cables;
a movable element suspended by means of the plurality of cables;
a movement system for moving the cables, the movement system comprising a plurality of winding elements of the cables which are drivable in rotation for winding/unwinding the cables,
wherein the cables comprise a first end connected to the movable element and a second end connected to a respective winding element of the movement system;
at least one cable of the plurality of cables comprises a central core and an outer cladding jacket, the central core is made of a conductive material to transmit electrical current and/or a command signal up to an end of the cable connected to the movable element; the outer cladding jacket is made of a braided synthetic material, the outer cladding jacket comprises a first inner layer comprising a plurality of first strands arranged about the central core and braided to one another to form a first braid wound about the central core, wherein each of the strands of the plurality of first strands is constituted by a series of monofilaments made of a high-density synthetic material braided to one another, the monofilaments made of a high-density synthetic material of the series of monofilaments which form the strands of the first series of strands are made of high-density polyethylene, and in that the outer cladding jacket comprises a second outer layer comprising a plurality of second strands, the second strands arranged about the plurality of first strands which form the first inner layer, the second strands are braided to one another to form a second braid wound about the first braid formed by the plurality of first strands braided to one another, each of the strands of the plurality of second strands is constituted by a series of monofilaments made of a high-tenacity synthetic material braided to one another, wherein the monofilaments made of a high-tenacity synthetic material of the series of monofilaments which form the strands of the second series of strands are made of polyester.

11. The cable-driven robot of claim 10, wherein the central core comprises a plurality of wires made of an electrically-conductive material.

12. The cable-driven robot of claim 11, wherein the plurality of wires made of an electrically-conductive material which form the central core are spirally-wound to one another.

13. The cable-driven robot of claim 11, wherein the plurality of wires made of an electrically-conductive material which form the central core comprise copper wires.

14. The cable-driven robot of claim 10, wherein the central core is constituted by a plurality of strands of galvanized steel wires spirally-wound to one another.

15. The cable-driven robot of claim 10, comprising an intermediate jacket made of an insulating material interposed between the central core and the outer cladding jacket of the cable.

16. The cable-driven robot of claim 15, wherein the intermediate jacket is made of PVC.

17. The cable-driven robot of claim 10, comprising a covering layer, arranged about the outer cladding jacket of the cable, which is made of polyurethane.

18. The cable-driven robot of claim 10, wherein the movement system of the cables comprises a plurality of movement units, at least one of the plurality of movement units comprises:
 a frame hinged to the base structure pivotingly about a vertical hinge axis so that the frame can rotate about the vertical hinge axis with respect to the base structure;
 a motor mounted on the frame; and
 at least a winding/unwinding element of a respective cable of the plurality of cables, the winding/unwinding element mounted on the frame and drivable in rotation by the motor.

19. A cable-driven robot comprising:
 a base structure;
 a plurality of cables;
 a movable element suspended by means of the plurality of cables;
 a movement system for moving the cables, the movement system comprising a plurality of winding elements of the cables which are drivable in rotation for winding/unwinding the cables,
 wherein the cables comprise a first end connected to the movable element and a second end connected to a respective winding element of the movement system;
 at least one cable of the plurality of cables comprises a central core and an outer cladding jacket, the central core is made of a conductive material to transmit electrical current and/or a command signal up to an end of the cable connected to the movable element, the central core comprising a plurality of wires made of an electrically-conductive material spirally-wound to one another;
 the outer cladding jacket is made of a braided synthetic material, the outer cladding jacket comprises a first inner layer comprising a plurality of first strands arranged about the central core and braided to one another to form a first braid wound about the central core, wherein each of the strands of the plurality of first strands is constituted by a series of monofilaments made of a high-density synthetic material braided to one another, the monofilaments made of a high-density synthetic material of the series of monofilaments which form the strands of the first series of strands are made of high-density polyethylene, and in that the outer cladding jacket comprises a second outer layer comprising a plurality of second strands, the second strands arranged about the plurality of first strands which form the first inner layer, the second strands are braided to one another to form a second braid wound about the first braid formed by the plurality of first strands braided to one another, each of the strands of the plurality of second strands is constituted by a series of monofilaments made of a high-tenacity synthetic material braided to one another, wherein the monofilaments made of a high-tenacity synthetic material of the series of monofilaments which form the strands of the second series of strands are made of polyester:
 an intermediate jacket made of an insulating material interposed between the central core and the outer cladding jacket of the cable;
 a covering layer, arranged about the outer cladding jacket of the cable, which is made of polyurethane; and
 wherein the movement system of the cables comprises a plurality of movement units, at least one of the plurality of movement units comprises: a frame hinged to the base structure pivotingly about a vertical hinge axis so that the frame can rotate about the vertical hinge axis with respect to the base structure; a motor mounted on the frame; and at least a winding/unwinding element of a respective cable of the plurality of cables, the winding/unwinding element mounted on the frame and drivable in rotation by the motor.

* * * * *